March 5, 1929.    L. A. MEDCALF    1,704,203
PICKING MACHINE
Filed Jan. 10, 1927
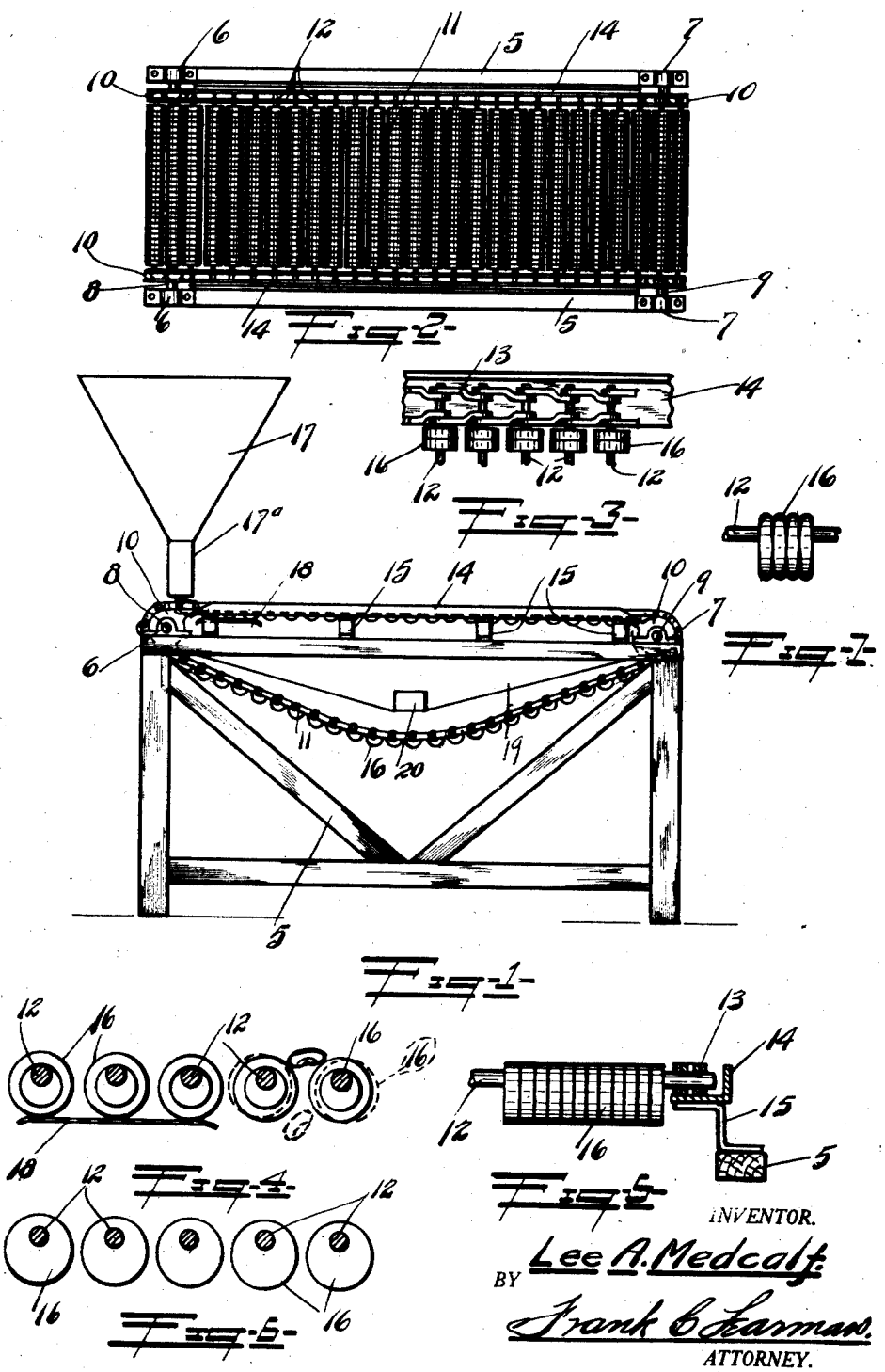
INVENTOR.
Lee A. Medcalf
BY Frank C. Farman
ATTORNEY.

Patented Mar. 5, 1929.

1,704,203

UNITED STATES PATENT OFFICE.

LEE A. MEDCALF, OF FAIRGROVE, MICHIGAN.

PICKING MACHINE.

Application filed January 10, 1927. Serial No. 160,117.

This invention relates to picking machines and the like, and particularly to a machine for picking beans, peas and other products of a similar nature.

One object of the invention is to design a machine for picking and sorting the cracked, discolored, or irregular shaped unmarketable product from the perfect, commercially salable product, and which comprises an endless belt, formed of a plurality of independent sections, loosely or pivotally mounted (off center) on a series of spaced apart rods, in such manner that these individual sections will swing on the rods, (when downward pressure is placed on the bean or product being picked) to permit the passage of the bean or other product, and immediately swing back to original position.

Another object is to design a machine or endless belt which will convey or carry the product in the usual manner, and through which the culls, and unsalable product can be easily forced in much the same manner that the keys of a typewriter are operated in writing a letter.

A further object is to provide means for leveling and spreading the product fed onto the endless belt, so that the product will be spread in a single layer and the culls and imperfect product be visible to the operator.

A still further object is to design a simple, compact, substantial and economical machine, which will be efficient in operation, and by means of which the output of the picker or operator can be materially increased.

The above and other objects will appear as the specification progresses, reference being had to the accompanying drawing in which I have shown the preferred embodiment of my invention, and in which like reference numerals indicate like parts throughout the several views thereof.

In the drawing.

Fig. 1 is a side view of my improved picking machine.

Fig. 2 is a top plan view thereof.

Fig. 3 is an enlarged fragmentary plan view of the chain and belt.

Fig. 4 is a fragmentary sectional edge view of the endless belt.

Fig. 5 is a fragmentary sectional transverse view thereof.

Fig. 6 is a view similar to Fig. 4 showing an alternate construction.

Fig. 7 is a view similar to Fig. 5 showing the belt sections rounded.

The machine shown is adaptable for picking products of various kinds, the following description being directed however to the picking of beans, such as is at present done in bean and grain elevators where a large number of pickers are of necessity employed to secure the necessary production.

It is at present common practice in picking and sorting beans, to use a continuous belt made up of canvas or other suitable material and onto which the product to be picked is fed, the operator then picks (with the fingers) the splits, culls, and imperfect product, depositing them in suitable receptacles provided therefor. In picking on a belt such as above described the operator's hand must travel over the belt to the bean to be picked, thence back to the side of the belt to deposit the bean in the receptacle or hopper, and repeat this operation for each bean picked, this constant contact with the belt wears the ends of the fingers and is a tedious operation, with my improved sectional belt, the hand travels over the belt to the cull bean, the finger is placed thereon, and downward pressure forces the sections of the belt to rock on their respective rods and permits the passage of the bean therebetween, after which these sections swing back to original position, the finger then travels to the next cull, and the operation is repeated. This eliminates the waste motion of the operator's hand moving to the side of the belt and back, enabling the operator to materially increase production, with a minimum of effort and labor.

Referring now particularly to the drawing in which is shown the preferred embodiment of my invention, the numeral 5 indicates the frame of the machine which can be made up of any suitable material, bearings 6 and 7 being bolted to this frame in spaced apart relation and transversely disposed shafts 8 and 9 are journaled in said bearings. Sprockets 10 are mounted on the shafts 8 and 9, and an endless belt or conveyer 11 is trained thereover, this belt comprising a series of spaced apart rods 12, the ends of which serve as the connecting pin for the sprocket chain links 13, as clearly shown in Fig. 3 of the drawing, said chain traveling on a track 14, formed of an angle supported above the machine frame by a plurality of bar iron supports 15, which are in turn securely bolted to the angle and machine frame respectively, the ends of the angles being slightly curved downwardly to prevent the chain catching the end thereof.

A plurality of individual sections 16 are loosely or pivotally mounted (off center) on these rods 12, and these can be formed by cutting a pipe into relatively narrow sections as shown in Figs. 4 and 5 of the drawing, or by the use of flat discs bored off center as shown in Fig. 6 and the face or outer periphery of these sections can be flat as shown in Fig. 5 or rounded similar to a ring, and as shown in Fig. 7 and these sections can be formed of metal, fibre, hard rubber, or any other suitable substance and the general shape thereof can also be varied if desired.

A hopper 17 is suspended above the continuous belt, the spout 17ª being provided with a gate (not shown) for regulating the flow of beans to the belt. In order that all imperfect product and culls may be visible to the operator, it is desirable that the beans be spread in a flat, single layer, and this I accomplish by providing a short section of screen 18 extending transversely across the machine and mounted on the frame at a height to engage the sections 16 as they travel thereover, this causes the sections to roll and spread the beans in a single layer, dust, dirt and thin split beans fall through the sectional belt and screen 18, the other unmarketable culls, etc., are clearly visible and are forced through the belt as above described, falling into a hoppered pan 19 secured in the frame beneath the belt, and which is provided with a discharge spout 20 in the usual manner.

The belt can be driven in any approved manner, either from a suitable power plant, or by means of a foot treadle attachment which is operated by the picker.

From the foregoing description it will be obvious that I have perfected a very simple, economical and effective picking belt or conveyor for use in sorting or picking products of various kinds, and by means of which production can be increased with a minimum of time and effort.

What I claim is:—

1. An endless belt comprising a series of spaced apart rods, and a plurality of individual cylindrical sections loosely and rotatably mounted on each rod.

2. An endless belt comprising a series of spaced apart links, and a plurality of individual cylindrical sections mounted off center on each link.

3. An endless belt or conveyor comprising a series of spaced apart rods, and a plurality of individual sections loosely and rotatably mounted on each rod in abutting relation.

4. An endless belt or conveyor comprising a series of spaced apart rods, and a plurality of individual cylindrical sections loosely and pivotally mounted on each rod.

5. A picking machine including a frame, an endless belt mounted thereon, and comprising a series of spaced apart rods, a plurality of individual cylindrical sections loosely mounted on each rod, and means mounted on said frame and engageable by said belt to roll said sections as the belt travels thereover.

6. A picking machine comprising a frame, an endless belt mounted thereon, and comprising a plurality of individual sections swingingly and pivotally mounted thereon, and a flat section of screen mounted on said frame and engageable by said belt to roll said sections as the belt travels thereover.

7. A picking machine comprising an endless belt formed of a series of spaced apart rods, a plurality of individual cylindrical sections loosely and rotatably mounted on each respective rod, the ends of the rods projecting beyond the belt and forming the connecting pins of a sprocket chain.

8. A picking machine comprising a frame, an endless belt mounted thereon and formed of a series of spaced apart rods, a plurality of individual cylindrical sections swingingly mounted on each rod, the ends of the rods projecting beyond the belt and forming the connecting pins of a sprocket chain, and spaced apart tracks on the frame, and on which said chain travels.

In testimony whereof I hereunto affix my signature.

LEE A. MEDCALF.